United States Patent
Houldsworth et al.

(10) Patent No.: US 7,477,158 B2
(45) Date of Patent: Jan. 13, 2009

(54) METHOD AND APPARATUS FOR BRIGHTNESS CONTROL OF INDICATION LIGHTS

(75) Inventors: John Houldsworth, Reston, VA (US); Nigel A. Jones, New Market, MD (US)

(73) Assignee: Texas Instruments Incorporated, Dallas, TX (US)

(*) Notice: Subject to any disclaimer, the term of this patent is extended or adjusted under 35 U.S.C. 154(b) by 100 days.

(21) Appl. No.: 11/151,229

(22) Filed: Jun. 14, 2005

(65) Prior Publication Data

US 2005/0275551 A1 Dec. 15, 2005

Related U.S. Application Data

(60) Provisional application No. 60/579,752, filed on Jun. 14, 2004.

(51) Int. Cl.
*G08B 21/00* (2006.01)
(52) U.S. Cl. .................. 340/636.1; 340/815.4; 362/276
(58) Field of Classification Search ............. 340/636.1, 340/815.4, 8.5, 45; 362/9, 276; 349/61; 455/566; 315/224
See application file for complete search history.

(56) References Cited

U.S. PATENT DOCUMENTS

| | | | | |
|---|---|---|---|---|
| 3,789,388 A | * | 1/1974 | Medwin | 345/52 |
| 3,936,162 A | * | 2/1976 | Krakau et al. | 351/243 |
| 4,743,096 A | * | 5/1988 | Wakai et al. | 345/89 |
| 5,970,419 A | * | 10/1999 | Terashima et al. | 455/566 |
| 6,051,957 A | * | 4/2000 | Klein | 320/132 |
| 7,005,978 B2 | * | 2/2006 | Takeuchi et al. | 340/475 |
| 7,047,049 B2 | * | 5/2006 | Lemeur et al. | 455/567 |
| 7,088,324 B2 | * | 8/2006 | Sakaguchi et al. | 345/87 |
| 2003/0214242 A1 | * | 11/2003 | Berg-johansen | 315/169.3 |
| 2005/0225983 A1 | * | 10/2005 | Fornell | 362/276 |

\* cited by examiner

*Primary Examiner*—George A Bugg
*Assistant Examiner*—Hoi C Lau
(74) *Attorney, Agent, or Firm*—William B. Kempler; W. James Brady, III; Frederick J. Telecky, Jr.

(57) ABSTRACT

A method for gradually increasing the brightness of an indicator light. An activation signal is received indicating that the indicator light should be lit. Upon receipt of the activation signal, the brightness of the indicator light gradually increases. Upon detection of deactivation of the activation signal, the indicator light is extinguished.

41 Claims, 4 Drawing Sheets

METHOD AND APPARATUS FOR BRIGHTNESS CONTROL OF INDICATION LIGHTS

This application claims priority to and incorporates by reference Provisional Patent Application No. 60/579,752 entitled "Battery State-of-Charge Indicator with Optimized Brightness Levels" filed Jun. 14, 2004.

FIELD OF THE INVENTION

The present invention relates generally to indicator displays, and specifically to indicator displays of differing brightness levels.

DESCRIPTION OF EMBODIMENTS OF THE INVENTION

Figure 1:
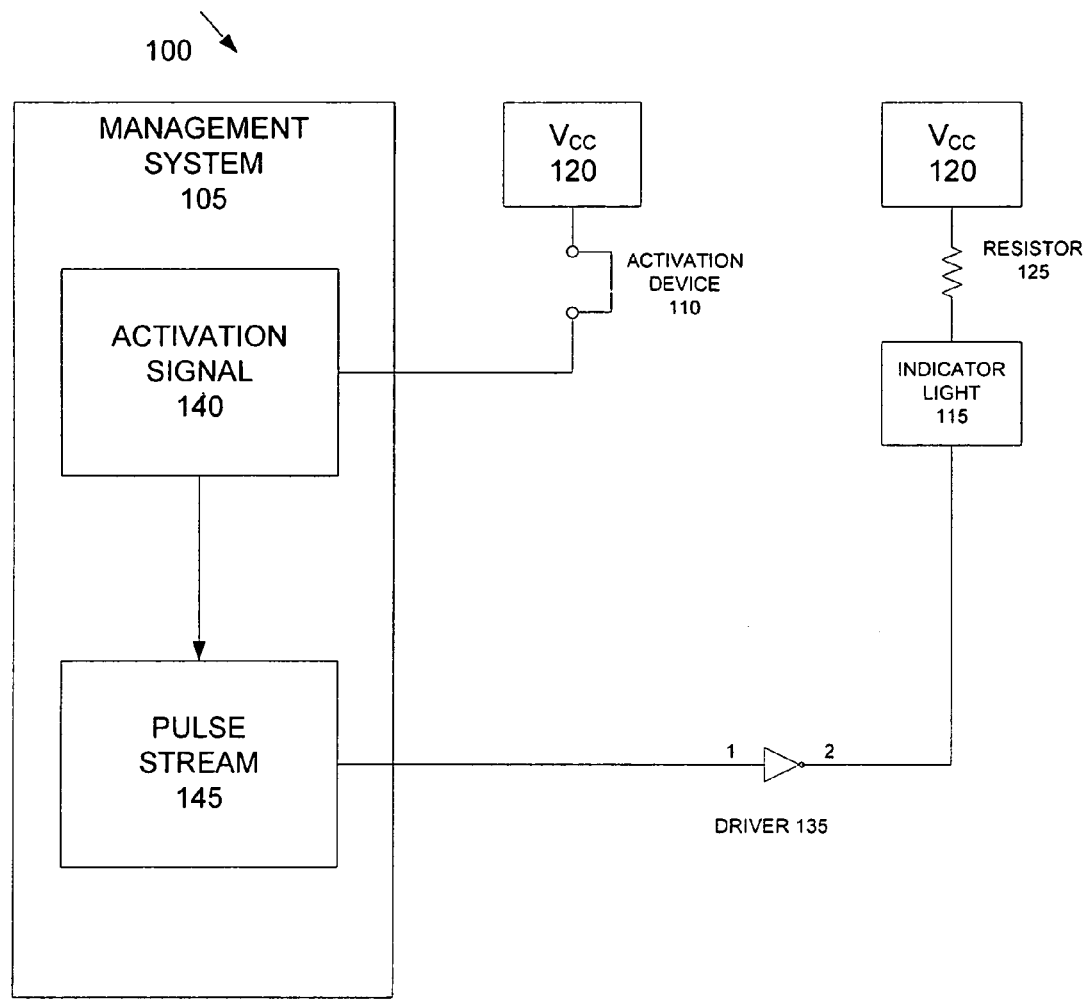
FIG. 1 illustrates an indicator light display system 100, according to one embodiment of the invention.

FIG. 1 illustrates an indicator light display system 100, according to one embodiment of the invention. The indicator light display system 100 is able to display indicator lights in a wide range of ambient brightness conditions, from absolute darkness to full sunlight. The indicator light display system 100 can be adapted to display multiple kinds of information in a wide range of devices, and can be used on any device where it is useful to be able to control the amount of light presenting the information being displayed. For example, the indicator light display system 100 can use indicator lights 115 to display the state of charge (SOC) of a battery, with the ability to ramp up the indicator lights 115 from minimal brightness to maximum brightness. A critical parameter of a battery pack is its SOC. The SOC is a measure of the battery pack's remaining capacity to deliver power. The indicator light display system 100 can indicate the SOC. As another example, the indicator light display system 100 can use an indicator light 115 to display the time on a clock, again with the ability to ramp up from minimal brightness to maximum brightness. Additional examples include, but are not limited to, using the indicator light display system 100 to display dashboard instrumentation signage (e.g., in an automobile or aircraft), displays on consumer products (e.g., a digital video recorder, a radio, a room thermostat, an alarm system control), etc.

Turning again to FIG. 1, an example drive circuitry for an indicator light 115 is illustrated, according to one embodiment of the invention. The drive circuitry can be duplicated for each indicator light 115 in a display system with multiple indicator lights 115. The indicator light display system 100 includes a management system 105 which is connected to an activation device 110 and at least one indicator light 115. The management system 105 holds the information to be conveyed. For example, in a battery, the management system 105 may comprise circuitry adapted to perform SOC monitoring functions and calculations. As another example, in a clock, the management system 105 may comprise circuitry adapted to monitor time.

The indicator light 115 is used to convey information to a user at varying levels of brightness. The indicator light 115 can be a light emitting diode, a laser diode, an incandescent bulb, a plasma display, any of a class of displays employing a direct indicator light, any of a class of displays employing a backlight (e.g., a liquid crystal display) where indicator light 115 would be a backlight for the display, or any other suitable devices, or any combination thereof.

In one embodiment, each indicator light 115 is connected to a power source $V_{cc}$ 120 via a current limiting resistor 125. In one embodiment, the indicator light 115 is connected to a driver 135. If the driver's output is low, then the current will flow through the indicator light 115 and the indicator light 115 will light up. Conversely, if the driver's output is high, then no current will flow and the indicator light 115 will be extinguished.

Figure 2:
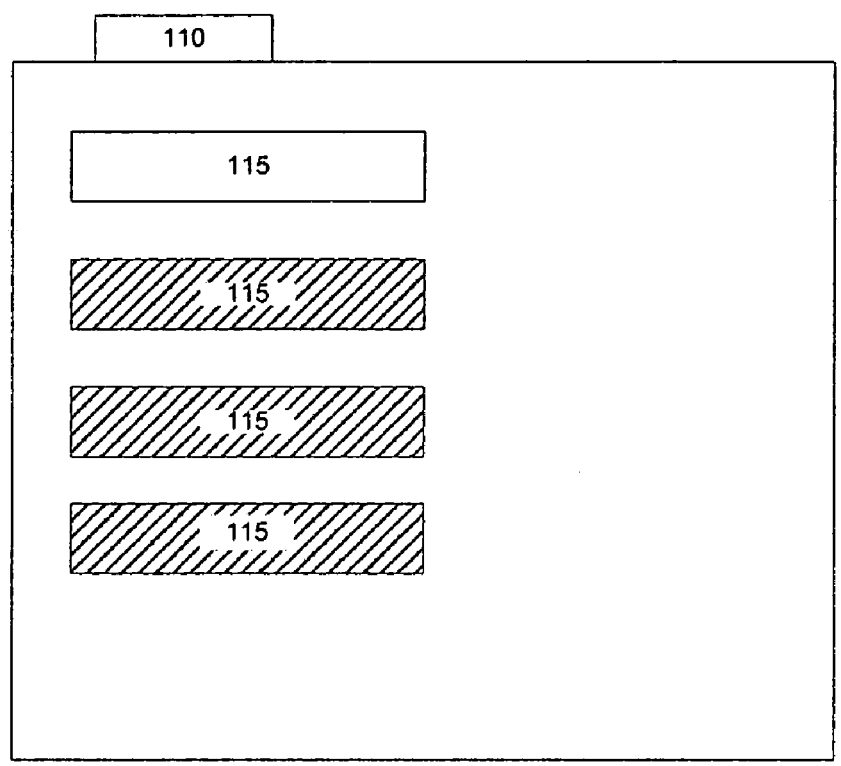
FIG. 2 illustrates an outside schematic view of an indicator light display system 100, according to one embodiment of the invention.

FIG. 2 illustrates an outside view of an indicator light display system 100, according to one embodiment of the invention. The indicator lights 115 are arranged in a row, although any other arrangement may be used. When the user wishes to know the particular information conveyed by the indicator light display system 100 (in this case, the SOC of a battery), he activates the activation device 110 and the number of indicator lights 115 proportional to the battery's SOC will light up. In this case, as 3 of the 4 indicator lights are lit (represented by the shading), the user will know that the battery is $3/4^{th}$ full. As the indicator light's optimal brightness level changes in accordance with the amount of ambient light, the user is able to allow the indicators to increase in brightness until the user determines they are of an optimal brightness.

Thus, the user can allow the indicator light brightness level to be optimized for any condition, such as a normally lit room, direct sunlight, or nighttime. Being able to control the brightness of the indicator light 115 is useful, for example, if the user is trying to maintain "night vision". (Note that the human eye reacts more slowly to decreases in light than increases. Thus, after being exposed to bright light in a darkened environment, it may take up to 10 minutes for the eye to re-adjust to a dimmed or darkened environment.) If the light is too bright, the user may be blinded and thus unable to determine how many indicator lights are illuminated. Furthermore, if the user is trying to remain hidden, the user wants a minimum amount of light so that he can see the indicator light, but not reveal his location.

Figure 3:
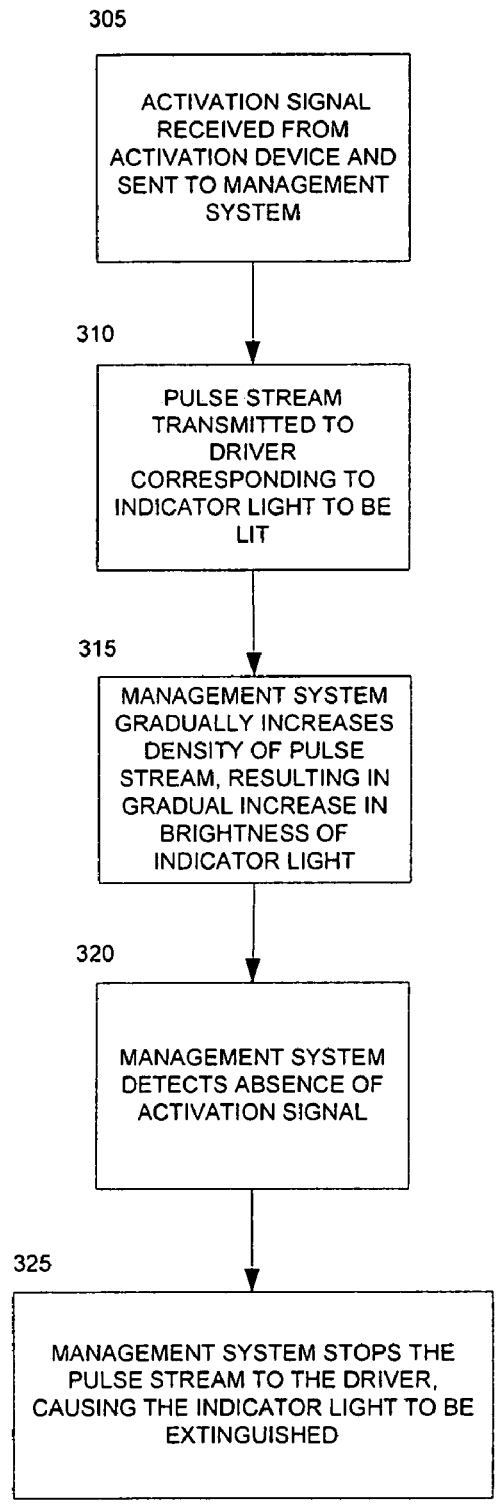
FIG. 3 illustrates a method of using an indicator light display system 100, according to one embodiment of the invention.

FIG. 3 illustrates a method of using an indicator light display system 100, according to one embodiment of the invention. In step 305, an activation signal 140 is received from the activation device 110 and sent to the management system 105, indicating that the indicator light 115 should be lit. The activation signal is continually transmitted. For example, a user can press down and hold a push-button, put his finger over a computer icon, or do anything else to indicate to the activation device 110 that the activation signal should be transmitted. In step 310, upon receipt of the activation signal by the management system 105, a pulse stream 145 is transmitted to the driver 135 corresponding to the indicator light 115 to be lit. (Note that the power provided to the indicator light 115 can be something other than a pulse stream. For example, the brightness of indicator light 115 can be controlled by varying power to the indicator light in an analog manner.) In step 315, the management system 105 gradually increases the density of the pulse stream 145, resulting in a gradual increase in the brightness of the indicator light 115. At any time during the gradual increase in the brightness of the indicator light 115, the user may stop the activation signal 140 using the activation device 110 to indicate that the indicator light 115 should be extinguished. For example, the user can release a push-button, remove his finger from a computer icon, or do anything else to indicate that the activation signal 140 should be extinguished. In step 320, the management system 105 detects the absence of the activation signal 140. In step 325, the management system 105 stops the pulse stream 145 to the driver 135, causing the indicator light 115 to be extinguished.

In one embodiment, if the number of indicator lights 115 that are lit is employed to communicate information (e.g., how much battery life remains), the measurement of how many indicator lights 115 to illuminate is made by the management system 105 prior to activating the indicator lights 115.

In one embodiment, once the indicator lights 115 reach maximum brightness, the indicator lights 115 will remain on for a short period and then automatically extinguish. A user can recheck the indicator light display system 100 by de-activating the activation device 110 and then re-activating it. In another embodiment, when the user indicates that the indicator light 115 should be extinguished, the indicator light 115 will remain on for a brief period before being extinguished.

In one embodiment, the gradual increase of the indicator light 115 is obtained by increasing the density of the pulse stream used to light indicator light 115 from one update interval to the next. The pulse stream can have a sufficiently high frequency so that the turning on/off of the indicator light 115 is not perceived as flickering. In one embodiment, a nearly linear increase in perceived brightness of the indicator light is achieved by using a non-linear change in the density of ON pulses provided to the indicator light. The non-linear change in current can be any non-linear relationship, such as a geometric relationship with the density increasing geometrically at a fixed ratio per sample, where the ratio can be 2:1, 3:1, or 4:1, etc. per update interval. In other words, the pulse stream can be doubled, tripled, quadrupled, etc., at each increment level.

Figure 4:
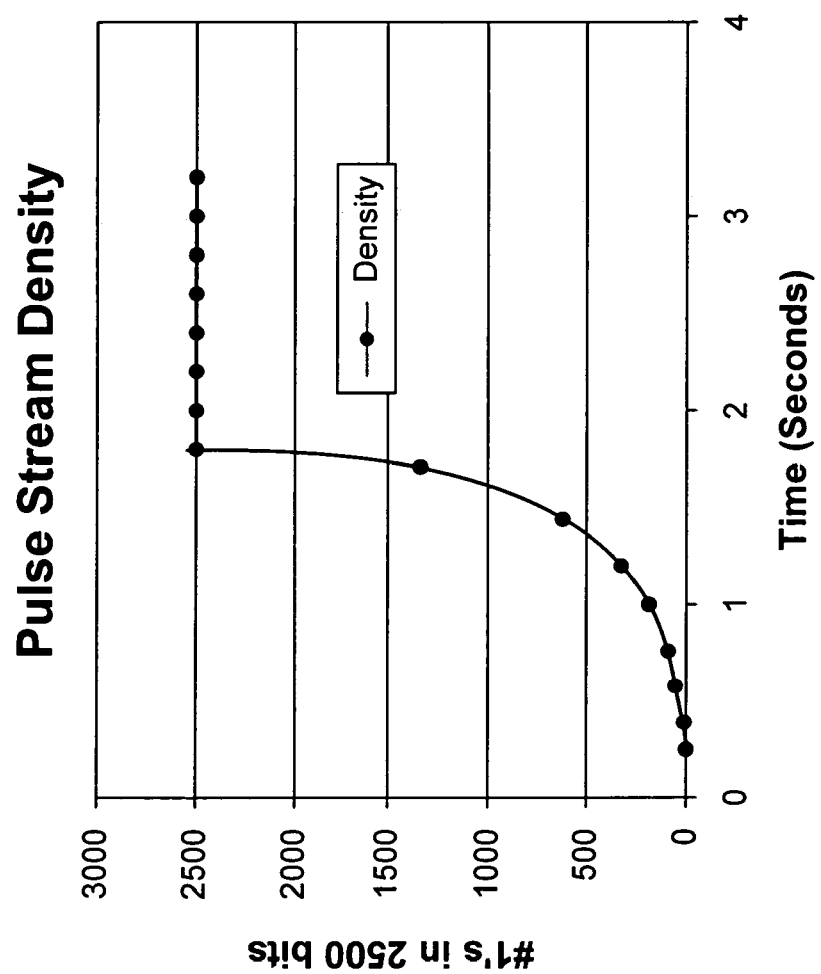
FIG. 4 illustrates a graph of pulse density modulation increasing geometrically with time at a 2:1 ratio per update interval, according to one embodiment of the invention.

FIG. 4 illustrates a graph of a 2:1 pulse stream versus time relationship, according to one embodiment of the invention. For a 2:1 ratio, the brightness increase is obtained by doubling the density of the pulse stream at each update interval. If the indicator light drive minimum on/off time of the pulse stream is 100 microseconds (the bit time), and the brightness update time interval is 0.25 seconds, then each update interval has 2500 bits (equal to the time interval 0.25 seconds divided by the pulse stream density 100 microseconds). Thus, to increase the brightness over 2 seconds, the density of 1 's in each interval is increased at an approximate 2:1 sequence: 10, 20, 40, 80, 160, 320, 640, 1250, 2500. (Note that it is a 2:1 approximation, and not an exact 2:1 relationship.) This 2:1 sequence shows both the doubling, and also the saturation point 2500, which results in continuous drive of maximum brightness to the indicator light 115. The doubling of the current flowing in the indicator light 115 results in a perceived linear increase in brightness by the human eye. At the start of the ramp, the density of 10/2500 results in 40 pulses per second, just above the threshold of perceived flicker by the human eye.

In the embodiment described above, pulse density modulation, which is a method of encoding information in a signal by varying the density of pulses to reflect the amplitude of illumination of the indicator light 115, is utilized. In another embodiment, pulse width modulation, which is a method of encoding information in a signal by varying the width of pulses to reflect the amplitude of illumination of the indicator light 115, is utilized.

What is claimed is:

1. A method for controlling an indicator light, the method comprising:
   receiving a manual activation signal indicating that the indicator light should be lit;
   upon receipt of the activation signal, causing the brightness of the indicator light to gradually increase in a predetermined time-sequence of brightness levels; and
   upon detection of a manual deactivation signal, causing the indicator light to be extinguished; and
   further comprising transmitting a pulse stream to the indicator light upon receipt of the activation signal, and varying the pulse stream, causing the brightness of the indicator light to gradually increase.

2. The method of claim 1, further comprising stopping transmission of the pulse stream to the indicator light upon receipt of the deactivation signal.

3. The method of claim 1, wherein the indicator light is extinguished after a short delay following receipt of the deactivation signal.

4. The method of claim 1, wherein the pulse stream is varied by increasing the density of pulses in the pulse stream.

5. The method of claim 1, wherein the pulse stream varies in a non-linear manner.

6. The method of claim 1, wherein the pulse stream controls the indicator light in a manner where flickering is not perceived by a human eye.

7. The method of claim 1, wherein the brightness of the indicator light is increased gradually until determined by a user to be adequate.

8. The method of claim 1, wherein the pulse stream is varied using pulse density modulation.

9. The method of claim 1, wherein the pulse stream is varied using pulse width modulation.

10. The method of claim 1, wherein the activation signal is generated by triggering an activation device, and the deactivation signal is generated by releasing the activation device.

11. The method of claim 1, wherein the activation signal is generated by triggering an activation device, and the deactivation signal is generated by re-triggering the activation device.

12. The method of claim 1, further comprising at least one additional indicator light.

13. The method of claim 1, wherein the indicator light is increased from unlit toward maximum brightness.

14. A system, comprising:
   a manual activation device;
   an indicator light; and
   a management system for accepting an activation signal from the activation device, and thereafter gradually increasing the brightness of the indicator light in a predetermined time-sequence of brightness levels, the management system further configured to cause the indicator light to be extinguished when the manual activation device generates a deactivation signal and
   further comprising the management system transmitting a pulse stream to the indicator light upon receipt of the activation signal, and the management system varying the pulse stream, causing the brightness of the indicator light to gradually increase.

15. The system of claim 14, wherein the management system stops transmission of the pulse stream to the indicator light upon receipt of the deactivation signal.

16. The system of claim 14, wherein the management system extinguishes the indicator light after a delay following receipt of the deactivation signal.

17. The system of claim 14, wherein the management system varies the pulse stream by increasing the density of the pulse stream.

18. The system of claim 14, wherein the pulse stream varies in a non-linear manner.

19. The system of claim 14, wherein the pulse stream controls the indicator light in a manner where flickering is not perceived by a human eye.

20. The system of claim 14, wherein the brightness of the indicator light is increased gradually until determined by a user to be adequate.

21. The system of claim 14, wherein the pulse stream is varied using pulse density modulation.

22. The system of claim 14, wherein the pulse stream is varied using pulse width modulation.

23. The system of claim 14, wherein the activation signal is generated by triggering the activation device, and the deactivation signal is generated by releasing the activation device.

24. The system of claim 14, wherein the activation signal is generated by triggering the activation device, and the deactivation signal is generated by re-triggering the activation device.

25. The system of claim 14, further comprising at least one additional indicator light.

26. The system of claim 14, wherein the indicator light is increased from unlit toward maximum brightness.

27. A battery monitoring system, comprising:
   a manual activation device;
   an indicator light; and
   a management system for accepting an activation signal from the activation device, and thereafter gradually increasing the brightness of the indicator light in a pre-determined time-sequence of brightness levels, the management system further configured to cause the indicator light to be extinguished when the activation device generates a deactivation signal and
   wherein the management system transmits a pulse stream to the indicator light upon receipt of the activation signal, and the management system varies a pulse stream, causing the brightness of the indicator light to gradually increase.

28. The battery monitoring system of claim 27, wherein the indicator light is a light emitting diode (LED).

29. The battery monitoring system of claim 27, further comprising at least one additional indicator light.

30. The battery monitoring system of claim 29, wherein the management system causes state-of-charge (SOC) of a battery to be indicated by illuminating a number of the indicator lights corresponding to how much charge remains in the battery.

31. The battery monitoring system of claim 27, wherein the management system extinguishes the indicator light upon receipt of the deactivation signal.

32. The battery monitoring system of claim 27, wherein the management system extinguishes the indicator light after a delay following receipt of the deactivation signal.

33. The battery monitoring system of claim 27, wherein the management system varies the pulse stream by increasing the density of the pulse stream.

34. The battery monitoring system of claim 27, wherein the pulse stream varies in a non-linear manner.

35. The battery monitoring system of claim 27, wherein the pulse stream controls the indicator light in a manner where flickering is not perceived by a human eye.

36. The battery monitoring system of claim 27, wherein the brightness of the indicator light is increased gradually until determined by a user to be adequate.

37. The battery monitoring system of claim 27, wherein the pulse stream is varied using pulse density modulation.

38. The battery monitoring system of claim 27, wherein the pulse stream is varied using pulse width modulation.

39. The battery monitoring system of claim 27, wherein the activation signal is generated by triggering the activation device, and the deactivation signal is generated by releasing the activation device.

40. The battery monitoring system of claim 27, wherein the activation signal is generated by triggering the activation device, and the deactivation signal is generated by re-triggering the activation device.

41. The battery monitoring system of claim 27, wherein the indicator light is increased from unlit toward maximum brightness.

\* \* \* \* \*